United States Patent
Kennel et al.

(10) Patent No.: US 12,423,569 B2
(45) Date of Patent: Sep. 23, 2025

(54) TRAINING ARTIFICIAL NEURAL NETWORKS WITH CONSTRAINTS

(71) Applicant: FAIR ISAAC CORPORATION, San Jose, MN (US)

(72) Inventors: Matthew Bochner Kennel, San Diego, CA (US); Scott Michael Zoldi, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1096 days.

(21) Appl. No.: 16/823,193

(22) Filed: Mar. 18, 2020

(65) Prior Publication Data
US 2021/0295175 A1   Sep. 23, 2021

(51) Int. Cl.
*G06N 3/08*    (2023.01)
*G06F 16/901*    (2019.01)
*G06F 18/214*    (2023.01)
*G06N 3/082*    (2023.01)
*G06N 5/01*    (2023.01)

(52) U.S. Cl.
CPC ........... *G06N 3/08* (2013.01); *G06F 16/9024* (2019.01); *G06F 18/214* (2023.01); *G06N 3/082* (2013.01); *G06N 5/01* (2023.01)

(58) Field of Classification Search
CPC .............................. G06N 3/08; G06N 3/0495
See application file for complete search history.

(56) References Cited

U.S. PATENT DOCUMENTS

2002/0072828 A1* 6/2002 Turner .................. G05B 17/02
                                                    700/32
2012/0296182 A1* 11/2012 Hornero Sanchez et al. ...............
                                                    A61B 5/7264
                                                    600/323
(Continued)

OTHER PUBLICATIONS

Alver "Attentive Deep Regression Networks for Real-Time Visual Face Tracking in Video Surveillance",Jul. 2019, Masters Thesis, Graduate School of Natural and Applied Sciences of Middle East Technical University.*

(Continued)

*Primary Examiner* — James D. Rutten
(74) *Attorney, Agent, or Firm* — Mintz, Levin, Cohn, Ferris, Glovsky and Popeo, P.C.; F. Jason Far-hadian, Esq.

(57) ABSTRACT

Systems and methods for training a machine learning model implemented over a network configured to represent the machine learning model are provided. At least one or more directed edges connect the one or more nodes an edge representing a connection between a first node and a second node, the second node computing an activation depending on the values of activations on first nodes and values associated with the connections, the connection being either conforming or non-conforming. The machine learning model may be trained by iteratively adjusting parameters w and b, respectively associated with weights and biases associated with edges connecting computational nodes. Connections between nodes may be sparsified by adjusting the parameter w to a first value for non-conforming connections during the training phase to reduce complexity of the connections among the plurality of nodes, or to ensure the input-output function of the network adheres to additional constraints.

21 Claims, 4 Drawing Sheets

(56) References Cited

U.S. PATENT DOCUMENTS

| | | | | |
|---|---|---|---|---|
| 2015/0066496 | A1* | 3/2015 | Deoras | G10L 15/16 |
| | | | | 704/232 |
| 2016/0358070 | A1* | 12/2016 | Brothers | G06N 3/082 |
| 2017/0185887 | A1* | 6/2017 | Droppo | G06N 3/048 |
| 2019/0188567 | A1* | 6/2019 | Yao | G06N 3/082 |
| 2019/0340526 | A1* | 11/2019 | Turner | G06N 3/04 |
| 2020/0134439 | A1* | 4/2020 | Turner | G06N 3/048 |
| 2020/0380357 | A1* | 12/2020 | Yao | G06N 3/08 |
| 2021/0182683 | A1* | 6/2021 | Dai | G06N 3/045 |
| 2021/0201526 | A1* | 7/2021 | Moloney | G06N 3/082 |
| 2022/0067527 | A1* | 3/2022 | Xu | G06N 3/063 |

OTHER PUBLICATIONS

Kim et al. "Learning Not to Learn: Training Deep Neural Networks with Biased Data", 2019, 2019 IEEE/CVF Conference on Computer Vision and Pattern Recognition.*

R. Potharst and A. J. Feelders. 2002. Classification trees for problems with monotonicity constraints. SIGKDD Explor. Newsl. 4, 1 (Jun. 2002), 1-10. https://doi.org/10.1145/568574.568577 (Year: 2002).*

Chapelon et al., "how to enforce Monotonic Constraints in XGBoost withScikitLearn?" Dec. 5, 2017, stackoverflow.com, <stackoverflow.com/questions/43076451/how-to-enforce-monotonic-constraints-in-xgboost-with-scikitlearn> (Year: 2017).*

Le Cun, Yann, John S. Denker, and Sara A Solla. "Optimal Brain Damage." *Advances in Neural Information Processing Systems 2* (*NIPS 1989*), edited by David S. Touretzky, Morgan Kaufmann Publishers Inc., 1990, pp. 598-605.

* cited by examiner

TRAINING ARTIFICIAL NEURAL NETWORKS WITH CONSTRAINTS

FIELD

The disclosed subject matter relates generally to the field of artificial intelligence (AI), and more specifically to technical improvements in training computer-implemented machine learning models to promote explainability and conformance of the machine learning models with certain requirements or objectives.

BACKGROUND

Machine learning models are computational models that are capable of representing a predictive relationship between a set of input variables and value of one or more output labels or outcomes. Typically, training data that includes input variables and known outputs is provided to a machine learning training system. Based on the input, values are assigned to free parameters in the machine learning model such that the model can be used to predict the output label, or the predicted distribution, given the set of input data.

Machine learning or AI models, also referred to as artificial neural networks, demonstrate flexible predictive power across a substantially large variety of domains. The functional form of an AI model may be designed based on the structure and learning ability of biological brains, which is highly flexible as compared to classical parametric models. This flexibility can unlock a high non-linear predictive ability in a compact and efficient form. The enhanced predictability can advantageously enable high prediction accuracy, a low false positive rate, compared to traditional statistical models.

Unfortunately, most state of the art AI models are associated with certain significant downsides, such as a highly complex and multi-layered network of nodes that is used to implement the AI models. Due to the opaque and complex nature of their features, these models are typically referred to as "black boxes"—the human mind, including the mind of the designers of the models, is often not fully capable of appreciating and understanding the complexity of unraveling rationale and weights of connections in the model architecture.

Various explainable AI techniques can be utilized to provide some level of external human understanding, but most of these techniques involve methods that use approximations under assumptions which can be invalid, especially when the designer cannot fully appreciate the functionality of a model. Further, applications of explainable AI may not be suitable or comprehensive to meet current regulatory standards, causing organizations to abandon the use of neural networks. As such, the human designer of these predictive machines cannot currently ensure that certain constraints derived from domain knowledge or secondary analysis are satisfied.

In a predictive model, it may be important to ensure that, for example, the credit risk estimated based on a loan-delinquency increases as the amount of delinquent dollars increases. Or, it may be desirable to prohibit a nonlinear interaction between variables that may be predictive but are disallowed by regulators. The designer or the ultimate user of the model may desire to impose the above constraints (and other requirements) to ensure compliance with regulation and reasonable performance as well as to reduce model risk, if the model is to be used in production where relationships may drift from the data set used for model training.

Currently, the above features cannot be readily implemented with a training system that pushes the neural network to predict a training label with high accuracy (low loss), while simultaneously imposing reduced complexity or a guarantee of desired properties upheld strictly by a completely trained neural network. In other words, the current challenge is the lack of ability to train neural networks that are explainable and palatable first, and predictive second, where compliance with certain model properties or outcomes are guaranteed.

Improved systems and methods are needed that can overcome the above noted shortcomings by applying quantitative constraints on the model's coefficients, such that the constraints are fulfilled exactly at the conclusion of training, with the model released to regulated production use having the required structure and interaction properties. It is further desirable that the improved models yield high predictive performance in empirical testing subject to the fulfillment of the constraints.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one or more embodiments, computer-implemented systems, products and methods for training a machine learning model are provided. Depending on implementation, a machine learning model may include a plurality of nodes with edges connecting them in a directed graph. In some instantiations, called feed-forward networks, the nodes are gathered into multiple layers. Desirably, at least one or more edges connect the one or more nodes across the multiple layers, an edge representing a connection between a first node, in a first layer, and a second node, in a second layer, for example.

The machine learning model may be trained by iteratively adjusting learning parameters, those parameters often being weight values associated with the edges connecting nodes. In a feed-forward network these parameters are identified with a weight matrix and bias vector for each connectivity layer that connects multiple layers of computational nodes. A connection may be either conforming or non-conforming depending on the identity of the connecting edge, and the associated weight value taken singly or compared to other connections, the nature of the constraints desired, and additional auxiliary values. Connections between nodes may be sparsified by further adjusting the associated weight parameter towards a first value (e.g., zero) for non-conforming connections during the training phase to reduce complexity of the model, thereby improving explainability and understanding, preferably without sacrificing accuracy and robustness of the system.

One or more constraints associated with the machine learning model's parameters or features may be introduced to guarantee certain regulatory or user-desired requirements are satisfied. The requirements may ensure monotonicity between the machine learning model's input and output values. One or more constraints associated with the machine learning model's parameters or features may be introduced to prohibit interactions between nodes that result in improper biases or feature combinations.

In some embodiments, the constraints are applied by interleaving in time, such that the weights change from one iteration of a loss-minimizing training algorithm to the next, where one or more constraints apply to one or more weight matrices in the network to meet one or more requirements. Weight value of a non-conforming connection may be decreased during the training phase. For example, the value of the non-conforming connection may be decreased to zero. In some example scenarios, the value of the non-conforming connection may be maintained at zero during the training phase after it has been decreased to zero, so that the trained machine learning model has all non-conforming weights set to zero at the completion of training, and during subsequent use of the trained network in a production phase.

A function of the value of the non-conforming connection may be less than value of a function associated with a constraint schedule that provides a value that decreases during the training phase. The function may involve an operation that clips the absolute value of the non-conforming connection to be less than the constraint schedule value by moving a corresponding weight value for the non-conforming connection to the nearest value consistent with the constraint schedule, in accordance with one or more embodiments.

In certain embodiments, a machine learning model implemented over a plurality of nodes forming multiple layers in a network configured to represent the machine learning model, such that at least one or more directed edges connect the one or more nodes an edge representing a connection between a first node and a second node, the second node computing an activation depending, without exclusion, on the values of activations on first nodes and values associated with the connections. The connection may be either conforming or non-conforming.

The machine learning model may be trained by iteratively adjusting parameters w and b, respectively associated with weights and biases associated with edges connecting computational nodes. Connections between nodes may be sparsified by adjusting the parameter w to a first value for non-conforming connections during the training phase to reduce complexity of the connections among the plurality of nodes, or to ensure the input-output function of the network adheres to additional constraints such as a sparse weight topology, monotonicity of some or all output versus input relationships, or restrictions of interactions among inputs in derived features in hidden nodes.

In accordance with one embodiment, a method for improving a computer-implemented machine learning model by way of constrained training, comprises, using training data, as input, during a training phase, to train the machine learning model to derive a parametric function that minimizes the error across input data associated with an prediction of output values. The machine learning model may be implemented over a plurality of nodes configured to represent the neural network machine learning model commonly represented as a directed graph comprised of nodes and edges, edges representing connections, the graph representing the machine learning model's computation, at least one or more edges connecting the one or more nodes, an edge representing a connection between a first node and a second node, the connection being either conforming or non-conforming, and associated with at least one weight parameter.

The method may further comprise continue training the machine learning model by iteratively adjusting parameters associated with the neural network architecture where the adjustment of parameters is driven by input training data, output training data, one or more predicted values from the machine learning model, and a loss function associated with the prediction and training data; determining that a first connection between two nodes in the network is conforming or non-conforming based on a constraint formula related to weights of the neural network during the training phase; and sparsifying connections between nodes in the network by adjusting the weight parameter associated with the connection towards a first value for non-conforming connections, the sparsifying being performed iteratively and gradually during the training phase to meet one or more constraints on the weights in the network. matrix constraint formula, where the weights matrix constraint formula include sparsity.

One or more constraints associated with the machine learning model's parameters or features may guarantee certain regulatory or user-desired requirements are satisfied. The requirements ensure monotonicity between one or more of the machine learning model's input and output values. One or more constraints may be associated with the machine learning model's parameters or features to prohibit interactions between nodes that result in improper biases or feature combinations. The constraints are applied by interleaving computational operations such that the operation of one iteration of a loss-minimizing training algorithm that causes a weights change is interleaved with an optional constraining operation that causes a weight change to one or more weight connections in the network to improve the satisfaction of one or more constraints.

During the constraining operation, functions of weight values of one or more non-conforming connection are changed during the training phase. The weight value of the non-conforming connection is maintained at zero during the training phase after the weight value of the non-conforming connection has been decreased to zero, so that the trained machine learning model has all non-conforming weights set to zero during a production phase. Possibly, during the constraining operation, a function of the weight values of a subset of the non-conforming connections is constrained to be less than or equal to the value of a function associated with a constraint schedule that provides a value that decreases during the training phase. The function may involve an operation that ensures the sum of squares of weight values of a subset of non-conforming connections is less than the constraint schedule value, by applying a projection operator on a subset set of non-conforming weights so that the result after the application of the projection operator results in a squared L2 norm (sum of squares) whose value is less than or equal to the constraint schedule value. The function may involve an operation that clips the absolute value of a non-conforming weight to be less than the constraint schedule value by moving a corresponding weight value for the non-conforming connection to the nearest value consistent with the constraint schedule.

In some embodiments, the constraining operation involves an operation that ensures the sum of squares of weight values of a subset of non-conforming connections is constrained to be less than or equal to the constraint schedule value, by applying a projection operator on a subset set of non-conforming weights so that the result after the application of the projection operator results in a squared L2 norm (sum of squares) whose value is less than or equal to the constraint schedule value. The projection operator may be implemented by multiplying the non-conforming set of weights by a real-valued scalar in the interval [0, 1] so that after the multiplication, the sum of squares of non-conforming weights is less than or equal to the constraint schedule value.

An L1 norm, equal to the sum of absolute values of non-conforming weights, may be substituted for the L2 norm. Desirably, constraint operators and definition of conforming and non-conforming may be applied and defined (a) network-wide, (b) per-layer, (c) per set of weights of connections incoming to any node, or (d) per set of weights on connections outgoing from any node. Definition and values of the constraint schedule or schedules may be defined (a) network-wide, (b) per-layer, (c) per set of weights of connections incoming to any node, or (d) per set of weights on connections outgoing from any node. Definition of conforming and non-conforming serves to keep the most important weight values as conforming and less important weight values as non-conforming.

Depending on implementation, the conforming may be defined as the largest K, determined externally or internally, values of one of the following functions of the set of weights, and the remainder being defined as non-conforming: (a) absolute value of weights, (b) first derivative of loss with respect to weight, (c) second derivative of loss with respect to weight, (d) first derivative of network output with respect to weight, (e) second derivative of network output with respect to weight, or (f) any mathematical function of any combination of (a-e). The set of weights considered in the conforming vs non-conforming determination comprises one or more of the following: (a) network-wise, (b) layer-wise, (c) connections incoming to a node, or (d) connections outgoing from a node. The K value may be set (a) network-wise, (b) layer-wise, (c) per connections incoming to a node, or (d) per connections outgoing from a node.

In one example scenario, the definition of conforming and nonconforming weights is so that a network where all non-conforming weights are zero results in one or more inputs having a monotonicity relationship with one or more network output values. The monotonicity relationship may be such that for an input node for which a monotonicity relationship is prescribed, two sets of inputs, identical except for modifying the values at the input node in question, results in output values o1 and o2 for the sets respectively, and results in:

$o1 <= o2$, when input values $x1 <= x2$, or $o1 >= o2$, when input values $x1 <= x2$.

The monotonicity relationship requirements are, optionally, between two or more input values and one or more output values. Definitions for conforming and nonconforming connections may be computed as a function of the signum value of a corresponding weight value, and zero or more auxiliary values stored or known at the nodes which are connected by the weighted connection. The auxiliary value at a node is a polarity value that may be selected from set $\{-1, 0, 1\}$. A conforming requirement may be given by the following table, with $P_s$ is the polarity of a source node associated with an output value, and $P_d$ is the polarity of a destination node associated with an input value, and $w_{sd}$ is the weight value between the source node and the destination node:

| Polarity Status | Conforming eight Requirement |
| --- | --- |
| $P_s \cdot P_d = +1$ | $sgn(w_{sd}) \geq 0$ |
| $P_s \cdot P_d = -1$ | $sgn(w_{sd}) \leq 0$ |
| $P_s = 0$ | any value |
| $P_d = 0, P_s \neq 0$ | $w_{sd} = 0$ |

In certain implementations, polarities of output nodes for which monotonicity requirements are needed are set to +1, and polarity of an input required to have positive monotonicity is +1, and the polarity of an input required to have negative monotonicity is −1, and the polarity of an input not required to have a monotonicity relationship is set to 0. Polarity values of hidden nodes are initialized to random values in allowable values $\{-1, 0, +1\}$, for example. Polarity values of hidden nodes may be re-estimated during the training process. Possibly, polarity values of hidden nodes not set to zero polarity may be reset by a procedure during the training process that chooses the polarity value which maximizes the number of conforming weights, the sum of the absolute value or value squared of the conforming weights, or any function depending on their values, among the incoming, or outgoing, or any combination or function of the combinations thereof.

According to at least one or more embodiments, definition of conforming and nonconforming weights is so that a network where all non-conforming weights are zero results in a network where only one input variable of a prespecified subset of input variables may have a causal effect, direct or indirect, on the computation of any hidden node's activation. Further, auxiliary information at each node is a polarity value from the set of variables whose interactions are specified to be limited, unioned with a marker value of 'none', e.g. $\{V1, V2, V3, \ldots, VN, none\}$, wherein the polarity values of the input layer of nodes are set to be the corresponding members of the constraint set of inputs, if the values match, or with the 'none' marker value, if the values are not part of the set. In one example, the definition of a conforming weight is such that the polarity of the source node is "none", or equal to the polarity of the destination. A weight connecting into an output node, and the definition of a nonconforming weight may be a weight which is not conforming.

Auxiliary information at a hidden node may be initialized at the beginning of training to a random value, in one example embodiment. The random value may belong to a set of allowable values including $\{V1, V2, V3, \ldots, VN, none\}$. Auxiliary values of hidden nodes may be re-estimated or reset by a procedure, during the training phase that chooses the auxiliary value which maximizes the number of conforming weights among the incoming, or outgoing, or any combination or function of the combinations thereof. Multiple sets of input variables that have interactions in hidden nodes may be restricted. In one example, a set of input variables is associated with a corresponding auxiliary information, and a conforming or non-conforming decision is computed using the set's auxiliary information.

In one aspect, the weights constraint formula reduces complexity of the connections by zeroing some of the weights among the plurality of connections making it easier to understand and explain the model's behavior or features. In certain scenarios, the weights constraint enforces monotonicity of a score output behavior for corresponding movement in an input feature to ensure palatability of model, or enforces regularization relationship to increase stability in the presence of noise or generalizability of the predictivity of the machine learning model outside the training data. The weights constraint may limit interactions between nodes that result in improper biases or feature combinations.

The weights constraint formula may be configured to ensure a certain quantity of connections are retained, with the remainder being considered to be non-conforming. The quantity of retained connections may be measured network-wide; or per layer of a network organized in; or per connection set incoming into a node; or per connection set outgoing from a node; or any combination thereof. Optionally, the weights constraint formula ensures a certain subset of connections are forced to be conforming, or forced to be non-conforming, or forced to a mixture of conforming or non-conforming, by an external configuration set by the operator of the machine learning training process.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
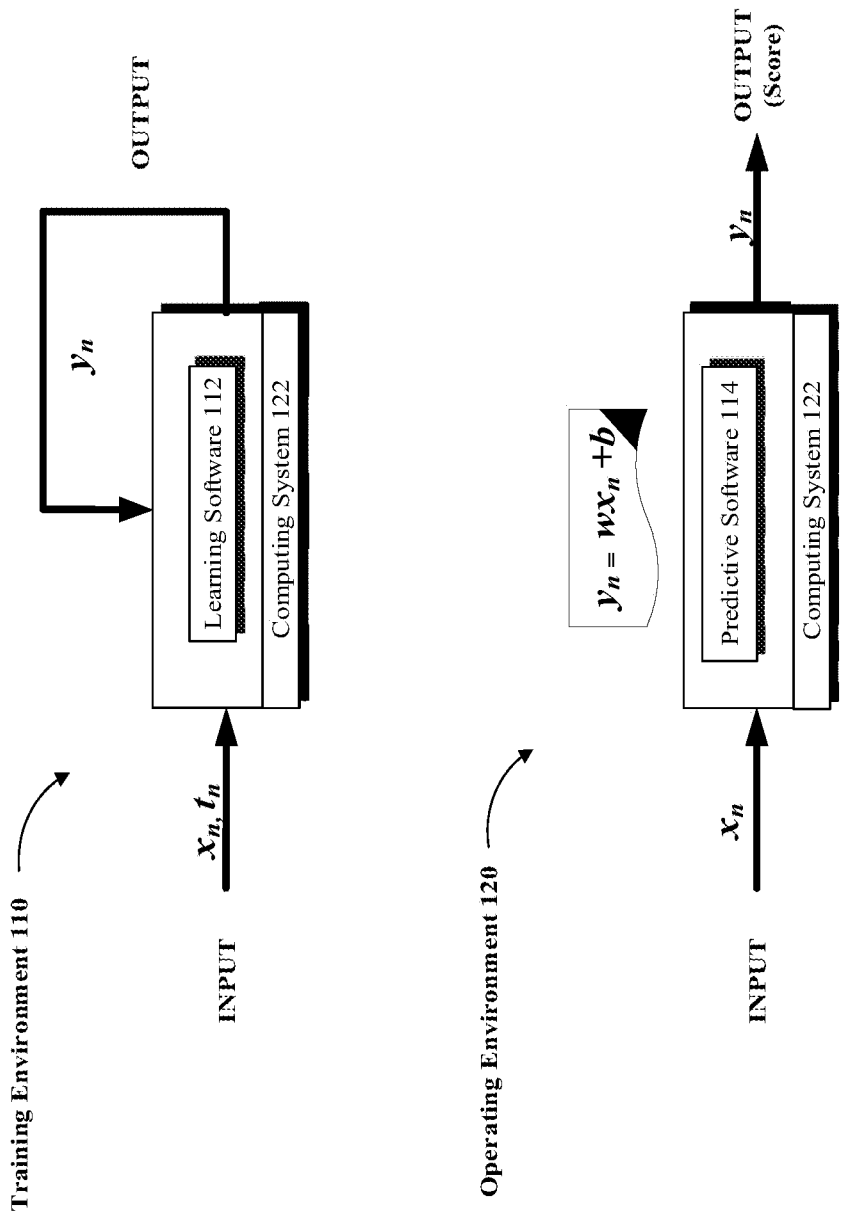
FIG. 1 illustrates example training and operating environments, in accordance with one or more embodiments, wherein an event may be classified as fraudulent or non-fraudulent by a machine learning model.

Referring to FIG. 1, example training environment 110 and operating environment 120 are illustrated. As shown, a computing system 122 and training data may be used to train learning software 112. Computing system 122 may be a general-purpose computer, for example, or any other suitable computing or processing platform. Learning software 112 may be a machine learning or self-learning software that receives event-related input data. In the training phase, an input event may be known as belonging to a certain category (e.g., fraudulent or non-fraudulent) such that the corresponding input data may be tagged or labeled as such.

It is noteworthy that while certain example embodiments may be implemented in a direct classification (e.g., hard classification) environment, other possible embodiments may be directed to score-based classification in a probabilistic sense (e.g., soft classification) as well as regression. Accordingly, learning software 112 may process the input data associated with a target event, without paying attention to the labels (i.e., blindly), and may categorize the target event according to an initial set of weights (w) and biases (b) associated with the input data. When the output is generated (i.e., when the event is classified by learning software 112), the result may be checked against the associated labels to determine how accurately learning software 112 is classifying the events.

In the initial stages of the learning phase, the categorization may be based on randomly assigned weights and biases, and therefore highly inaccurate. However, learning software 112 may be trained based on certain incentives or disincentives (e.g., a calculated loss function) to adjust the manner in which the provided input is classified. The adjustment may be implemented by way of adjusting weights and biases associated with the input data. Through multiple iterations and adjustments, the internal state of learning software 112 may be continually updated to a point where a satisfactory predictive state is reached (i.e., when learning software 112 starts to more accurately classify the inputted events at or beyond an acceptable threshold).

In the operating environment 120, predictive software 114 may be utilized to process event data provided as input. It is noteworthy that, in the operating phase, input data is unlabeled because the classification (e.g., the fraudulent nature) of events being processed is unknown to the model. Software 114 may generate an output that classifies a target event as, for example, belonging to a first class (e.g., the fraudulent category), based on fitting the corresponding event data into the first class according to the training data received during the training phase. In accordance with example embodiments, predictive software 114 may be a trained version of learning software 112 and may be executed over computing system 122 or another suitable computing system or computing infrastructure to generate one or more outputs, classifications or scores that can be used to make determinations or predictions.

In the context of the operational use of machine learning scores, it may be important to provide explanations of the scores to the stakeholders who are interested in reasoning that match the business domain, not explanations primarily geared to quantitative model developers. For example, reasons may need to be provided when the score is used to reject a customer's loan application. In fraud and cybersecurity applications, the score is usually used to accept or block transactions and the explanation algorithm provides guidance to analysts where to start their investigation of fraud. It is noteworthy that while example implementations provided herein may refer to using computational modeling and machine learning to generate a score used for detecting fraud or apply to events involving financial transactions, such example implementations and details should not be construed as limiting the scope of the disclosed subject matter to the particular embodiments or fields of use.

In one or more embodiments, explanations may be provided for individual observations and scores, and not for the overall predictive worth of various features in a model, or generally, techniques to assist model developers. Overall feature sensitivity is important to model developers but is distinctly a different problem from operationalized explanations for individual observations required by explainable AI. For example, an operational scoring system in a business context, such as real-time financial transaction scoring may impose technical constraints on computational resource consumption and societal and regulatory requirements on palatability and sensibility to an outside customer or client.

Further, in certain implementations, instead of or in addition to, a single universal, objective definition of an explanation for a score of a machine learning model, an explanation model and computational technique may be provided to explain a model's scores based on the notion that the model itself is a summarized description of probabilities and trends in the real-world dataset, and the explanations of scores in terms of underlying features may be coherent with properties of that dataset and the real world situation which generated it, meaning heuristically sensible and probabilistically consistent with large-scale observed trends in the dataset.

To help improve the currently available AI models that suffer from relational complexities that are difficult for a human mind to understand or appreciate and to enforce certain desired model behavior according to mandatory constraints, in the following, novel systems and methods are provided for training a feed forward artificial neural network. Using the novel methodologies and improvements, an AI network may be successfully trained to obey certain constraints (e.g., a sparse weight connectivity pattern that increases out-of-sample or out-of-time performance and/or network explainability) and to implement desirable input-output global monotonicity constraints along with the prohibition of interaction in one or more hidden layers of certain features (e.g., as specified by the user or designer). Such constraints result in an artificial neural network methodology more palatable for deployment in settings with regulatory oversight, improved human understandability, and robustness to changing external conditions.

In accordance with one or more embodiments, the following constraints may be adopted:

Sparse connectivity in a layer: Limit the number of non-zero weights in a weight layer to a certain fraction of the total number of weight connections available, or to limit the set of non-zero weights in a weight layer to match an externally specified mask. Limit the number of non-zero nodes that may serve as a "regularization" operation to limit the computational complexity of the network to avoid overfitting to chance fluctuations in the input data set, and to ensure the performance of out-of-sample or out-of-time examples not used during the training comes closer to the measured performance of the examples used in the training set.

Sparse connectivity on incoming weights to a hidden node: Limit the number of non-zero weights connecting inwardly to any hidden node in the network. If this limit is small, then the composite features induced by the hidden nodes during training are more intuitively explainable and understandable to human interpretation.

Monotonicity: Ensure that certain input features/variables, as chosen by the modeler using a priori knowledge or requirements, have a guaranteed, global monotonic relationship between input value and output value, either monotonically increasing or decreasing.

Forbidding unwanted interactions: Ensure that when examining weight connections into any hidden node, force into training that only one of a larger set of user-specified input features may have any influence upon that hidden node. This property will be cascaded through all hidden layers of the neural network.

A highly sparse neural network is one that has a large fraction of activations or weights of exactly zero, in contrast to a "dense" network. In accordance with one aspect, networks with weight matrices (constant during scoring phase) may be trained with many zero elements, with low degradation in classification performance compared to an unconstrained dense network. The goal would be to alter the training method in order to promote sparse solutions. In some implementations, the above goal may be achieved by reducing the total number of non-zero weights in a fully connected network or removing certain channels in a convolutional network (e.g., in image processing). The above methods tend to achieve low-computational-resource inference (scoring) of new examples. Furthermore, sparsity-inducing training methods may operate by successively "pruning" (setting to zero) a fraction of weight connections at a time, with variations on the specific definition of computed value used to select the weights to be pruned and the details relating to the operation of the pruning algorithm.

The above methods impose sparsity after the model has been trained and can be inefficient. In an improved implementation, sparsity may be imposed during training, without relying on iteratively sparsifying a prior developed model, and without forcing some weights to zero during intermediate stages of training. In one or more aspects, a specific pattern of sparsity may be imposed during training to increase explainability, by limiting the connectivity and thus the interactions of input features. One or more hidden unit may be fed from a small number of inputs, or from other hidden units with similar constraints, specifically limiting the number of non-zero weights on incoming connections to a hidden node. This means that the set of non-linear interactions, i.e. computed values at hidden nodes are sufficiently small, and involve a small number of inputs, such that a human analyst could examine the non-zero connections, and generate an explanation relating to the real-world domain knowledge that relates those retained inputs.

In some embodiments, the explainability may be useful for model governance and regulatory purposes, where the non-linear relationship is explicitly labeled and described. A conventional dense neural network might have non-zero connections from dozens to hundreds of inputs, and the combinations of all of them become opaque to human cognitive understanding. In accordance with one or more aspects, constraints may be imposed to limit this dense connectivity during model training, with a low impact on the predictiveness of the neural network model. There is also a side benefit to computational efficiency at scoring time, if computational techniques suitable for sparse matrix operations are used after the model has been trained to have enhanced sparsity.

In certain implementations, instead of directly setting some non-zero weights deemed to be less important to zero, some or all but the top K magnitude weights are constrained to limit their total size, with that size bound decreasing to zero gradually during the training process, until at the conclusion of training the sparsity constraints are achieved. In other words, the weights in the AI network are methodically constrained during the training of the AI model, instead of arbitrary pruning of the model after it has been trained.

In one non-limiting example, prior to training, the user sets the value of "K", an integer value corresponding to the maximum number of non-zero weights incoming into a hidden node permitted at the end of the training process. For instance, K=2 would mean that only pairwise interactions of inputs or hidden units on the previous layer are allowed, leading to a very sparse and trivially explainable network structure. After one or more learning steps have been executed in the neural network trainer (e.g., with an algorithm of the modeler's choice), a new candidate weight matrix is produced and a constraint operator is applied to the weight matrix.

For enhancing explainability by limiting cardinality of non-zero weights impinging on a hidden node, a constraint may be independently applied at a hidden node for which the constraints are desired. A connection into a hidden node is designated as "conforming" or "non-conforming". The non-conforming weights will be gradually shrunk during training until they are zero. For this sparsity constraint, the conforming weights are the K largest weights by absolute value relative to the others incoming into a hidden node, and the non-conforming weights are the remainder.

In one implementation, a weight matrix element $w_{ij}$ corresponds to the weight connecting input node i and hidden node j in the activation layer above, for each value of j independently (each hidden node), one row of the weight matrix is collected into an unsorted vector $u_i=w_{ij}$ then $u_i$ is sorted with respect to descending order of absolute magnitude, forming $v_k=u_s(k)$, with S(k) being the permutation of the indices that results in a descending sorted order in absolute magnitude, i.e. $|v_a| \geq v_b|$ if $a \leq b$. This is explicitly ranking the importance of each input by the absolute size of the weights, but as a disclosed variation, one may choose as a ranking criterion any multiplicative combination of any power or any function of:

weight absolute magnitude, first derivative of loss function or network output with respect to the weight second derivative of loss function or network output with respect to the weight As a variation of the method, a constraint to limit the number of non-zero terms in a weight matrix, regardless of their location, proceeds by flattening out the weight matrix's elements into a vector $u_i$, sorting and proceeding with the constraint procedure, though this constraint is more relevant for regularization and computational efficiency than limiting the complexity of non-linear interactions directly for explainability because the number of non-zero weights impinging upon a hidden node is not directly constrained. The top K most important weights may be called or selected using the chosen criterion to be "conforming" and the remainder to be "non-conforming". After the ranking of input importance is completed, the constraint is applied to limit the sum of squared values of the non-conforming weights to be less than a scalar constraint value C, i.e. requiring that $$\sum_{k=K+1}^{M} v_k^2 \leq C.$$

If the constraint is violated, then we rescale the values, by a multiplicative constant $$\alpha = \sqrt{C / \sum_{k=K+1}^{M} v_k^2} < 1$$

to fulfill the constraint: $v_k \leftarrow \alpha v_k$, $\forall k \in [K+1, M]$, with the K most important values being unaffected. To complete the update, the corresponding row of the weight matrix is written with the updated values after inverting the sorting permutation, i.e. $w_{ij}=v_{s^{-1}(i)} \in i=1 \ldots M$. The constraint is applied to all hidden nodes the user wishes to constrain cardinality of non-zero input connections in a constraint enforcement iteration which optionally occurs after each learning iteration.

In one aspect, C is gradually lowered during the training process, using a time-dependent C(T), with T measured in units of training epochs or mini-batches, for example. This involves choosing a constraint schedule' with a function C(T) which declines from an initial value at some initial time $T_0$ to zero at a later time $T_1$ and any subsequent time, with a decreasing function connecting the initial constraint value $C_0$ to zero. It is particularly desirable to use a function which declines faster for time values in the earlier part of the $[T_0, T_1]$ interval, and slower towards the end of that interval, i.e. a function whose derivative increases from large negative values to small negative values.

An example, function is provided below:

$$C(T) = \begin{cases} C_0 & T < T_0 \\ C_0 \left(\frac{T_1 - T}{T_1 - T_0}\right)^\gamma & T_0 \leq T \leq T_1, \gamma \geq 2 \\ 0 & T_1 \leq T \end{cases}$$

In one implementation, the values of $C_0$, $T_0$, $T_1$, $\gamma$, are chosen by the user. Examples values include: $C_0=1$, and $\gamma=3$ for multiple tasks. With such a schedule, at the end of training at some time after $T_1$, the cardinality constraints will be satisfied exactly, and the slow imposition of the constraints during the training phase maintains the predictive performance to a major degree compared to unconstrained model performance.

In one or more embodiments, the monotonicity of input against an output may need to be constrained. For example, in certain regulated industries, such as finance and insurance, it may be necessary for a neural network machine learning model to guarantee monotonicity of certain model inputs. In other words, the output score of the machine learning model must be constructed to be monotonically increasing (or decreasing, depending on the user's choice) with increasing increments of an input variable's value. The model designer may also wish to impose monotonicity requirements as model regularization to reduce overfitting, using constraints and experience from domain knowledge.

Monotonicity may be defined as the condition that the score (a monotonic function of an output value), S(V), depending explicitly on a specified monotonic-positive variable V, must satisfy the property that $S(V_2) \geq S(V_1)$ for all $V_2 \geq V_1$ holding all other inputs constant. A monotonic-negative variable satisfies the condition $S(V_2) \leq S(V_1)$ instead. In practice, the model may be trained on one dataset (for example from data extracted in a certain time interval) and used for operational decisions at a later time, at which point underlying distribution may have drifted due to changes in the external world. In one aspect, the monotonicity property may be fulfilled globally, i.e. for all allowable values of $V_1$, $V_2$ and other input variables, and not only statistically on the observed training or validation dataset, which may be important when these regulated models are used in practice vs. the laboratory, so that even in a new operational environment and dataset distribution, the monotonicity property will still hold.

In certain embodiments, a condition may be provided to guarantee a neural network possesses a certain monotonicity property for desired variables, and then a training method may be implemented to impose this condition in model training. In one aspect, the activation function for the hidden nodes and output may be monotonically increasing. Commonly used activation functions, such as tan h, ReLU, and sigmoid have this property, for example. An activation node will have an additional parameter (i.e., polarity), which is an integer in $\{-1, 0, +1\}$. Nodes are associated with inputs, outputs, and hidden nodes. An input that is required to be monotonic-up has the polarity value associated with its input node of polarity +1, monotonic-down implies a polarity value of −1, and unconstrained inputs are polarity 0. The output node has polarity +1, as do all bias units (any nodes set to fixed activation +1). The hidden nodes will have their polarities re-estimated during the training process.

A weight $w_{sd}$ in a weight matrix connects nodes with polarities $P_s$, $P_d$, the first being the source, and the second the destination. The incoming weights may be classified into two categories, "conforming" and "non-conforming", the conforming weights satisfying the conditions in the table given the polarity status, and non-conforming those that violate the constraints, and the monotonicity requirement is satisfied when the weights are conforming.

| Polarity Status | Conforming weight Requirement |
|---|---|
| $P_s \cdot P_d = +1$ | $\mathrm{sgn}(w_{sd}) \geq 0$ |
| $P_s \cdot P_d = -1$ | $\mathrm{sgn}(w_{sd}) \leq 0$ |
| $P_s = 0$ | any value |
| $P_d = 0, P_s \neq 0$ | $w_{sd} = 0$ |

The training procedure to develop a monotonic neural network is provided below in a manner that is nearly the same as the sparsity inducing method, where a constraint is applied to the weights incoming to a hidden node, constraining the sum squared of the non-conforming weights to be below a bound C(T) which decreases to zero during the training process, thereby making all weights conforming at the end of training. The difference between monotonicity and the sparsity method is in the definition of "conforming" and "non-conforming". A constraint schedule like that used to induce sparsity is effective.

Figure 2:
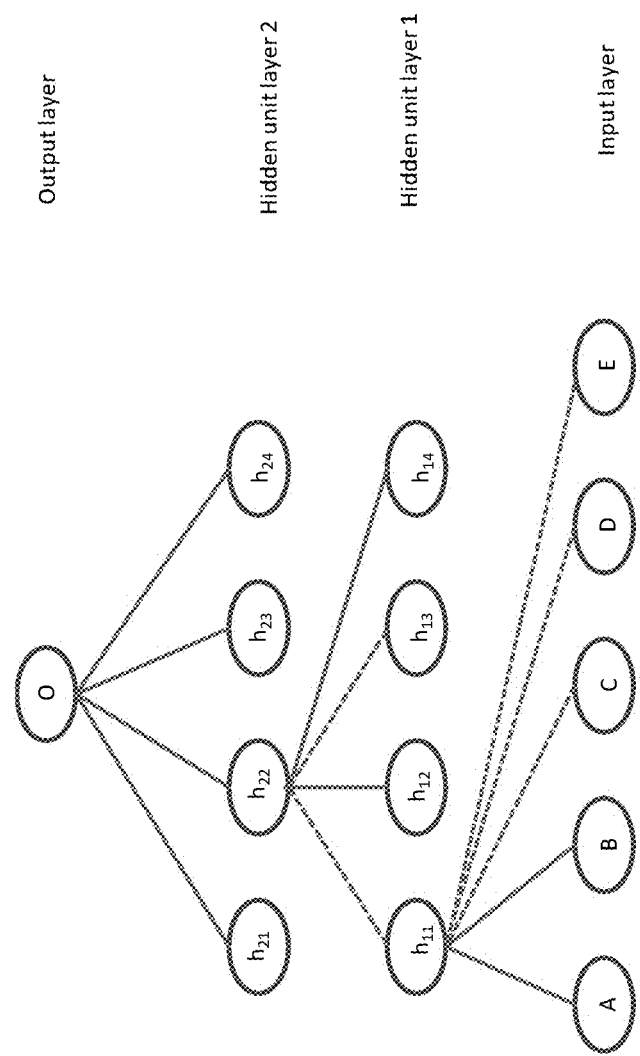
FIGS. 2 and 3 are example diagrams of nodes in an AI model with conforming and non-conforming weights, in accordance with one or more example scenarios.
Figure 3:
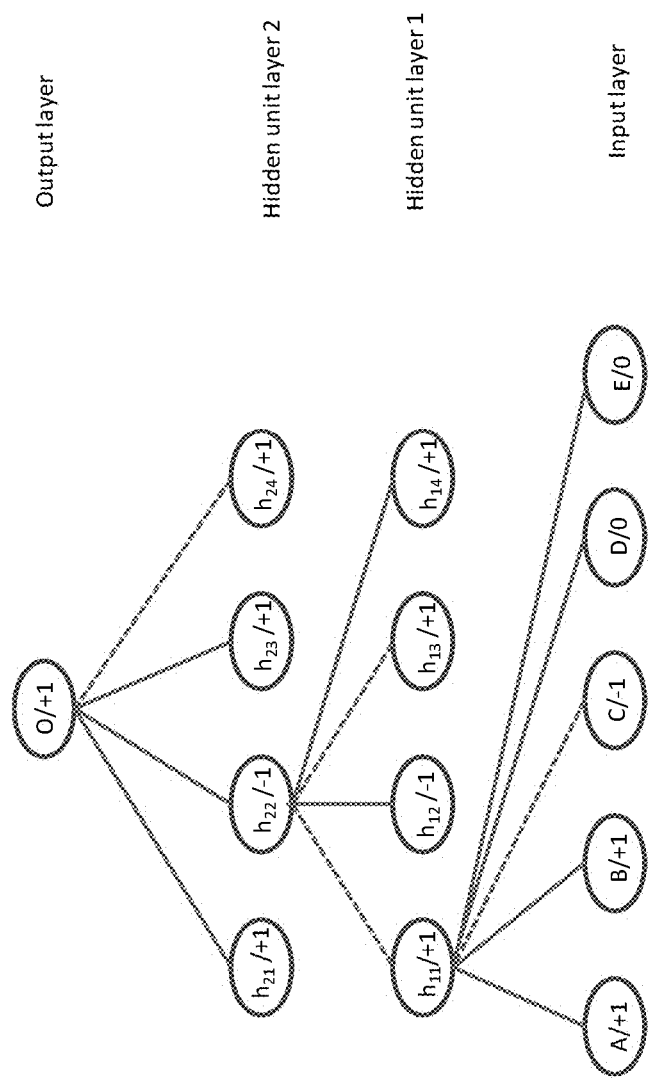

Referring to FIGS. 2 and 3, in certain aspects, the polarity values for the hidden nodes may be considered. Starting at time $T_0$, for example, and continuing until time $T_1$, intermittently in a minority of minibatch updates, there is a polarity estimation for hidden nodes applied before the weight constraint. The polarity estimation for hidden nodes (e.g., when polarities of input and output nodes are fixed) operates by examining, in a layer at a hidden node, the absolute sum of those weights which are conforming hypothetically supposing the node in question were assigned polarity +1 and that same sum hypothetically supposing the node in question were assigned polarity −1. The choice of polarity associated with the larger of these sums gives the new polarity for the hidden node. The set of outgoing weights may be examined emanating from a hidden node, and organized into two classes conforming to the two hypothesized polarities, and assigning an updated polarity value (which will often be the same as the existing polarity) to that hidden node.

In some implementations, the process is iterated from the top weight layer (closest to output) downward, with polarities of input nodes maintained fixed. It is advantageous to avoid re-estimating polarities in every learning step in order to give the network training process time to adapt to a change and redirect the weights to minimize the loss function. Re-estimating polarities in a minority of learning steps, for example every 100 to 1000 iterations, is effective.

In some cases, such as if a few of many possible inputs have a monotonicity constraint, the user may wish to reserve a subset of hidden nodes per layer to have polarity zero. Under such conditions, no monotonicity-constrained input can directly or indirectly influence hidden nodes with polarity zero, but the weights connecting the hidden nodes are otherwise unconstrained, allowing full performance for computations using unconstrained inputs as allowed by the model designer and regulation. The fraction of such hidden nodes set to polarity zero must be determined experimentally on account of tradeoffs on the predictive influence of constrained vs non-constrained inputs.

Referring to FIG. 2, computational units of an artificial feed forward network, starting with inputs A, B, C, D, E and leading to output O, are illustrated. The lines between the nodes reflect edges or relationships between the network nodes and the weights in the associated AI model. A solid line represents a conforming weight and a dashed line represent a non-conforming weight. The input nodes are provided with observed data, and computation proceeds by computing preactivations as a linear operator (matrix multiplication with a weight matrix) on the previous layer's units, followed by an activation function at a node. The next layer of activations is computed similarly. In FIG. 2, an example scenario is shown for a sparsity-inducing constraint where, for example, only two weights incoming into a hidden unit may be non-zero upon completion of training.

As shown, as a representative of an intermediate stage of training, hidden unit $h_{11}$ is being fed from inputs A, B, C, D, E, but optionally only the inputs from A and B are "conforming", being the largest two (in magnitude) of those weights incoming into this hidden unit. In the second hidden layer, the incoming weights to hidden node $h_{22}$ from the previous hidden layer are shown. Similarly two of the four incoming weights are conforming. There is no constraint applied to the weight layer feeding into the output node and so all weights are conforming and unconstrained. At the completion of training, the non-conforming weights, represented by dashed lines in the diagram, will be zero. In the actual computation, weights incoming into the hidden nodes exist and have a conforming or non-conforming status, but for illustrative clarity only those incoming into the two mentioned hidden units are shown in this figure.

Referring to FIG. 3, a feed forward network during operation of a monotonicity constraint is presented. As shown, a computational unit, in addition to its usual value, retains an additional polarity variable in $\{-1, 0, +1\}$. The status of whether a connecting node is conforming or not depends on the sign of the weight, and the polarities of the nodes that the weight connects. In this example, a user has asked for inputs A, B, with +1 polarities, to result in non-decreasing outputs with increasing input, and input C, with −1 polarity, to be non-increasing output with increasing input. Inputs D and E, with a zero polarity, are not constrained. The polarities of input layer and output layer may be fixed, for example. The polarities of the hidden units may be re-estimated during the model training. At completion of training, the non-conforming weights will be zero. For illustrative clarity, only those weights incoming into the two mentioned hidden units are shown in FIG. 3.

An example method to constrain the combination of certain input features in the construction of hidden nodes is provided below. One motivation for such a constraint is to preclude the neural network from inducing derived features from model training which may be proxies for, or highly correlated with some properties relating to demographics of a protected class, or any combination which might induce regulatory scrutiny. Another motivation for a modeler to insert domain knowledge or expertise about the structure of the underlying physics and behaviors, for instance, to preclude some "nonsensical" combinations of features as they may be likely to be non-robust under non-stationary conditions.

In one example method, it is assumed that the modeler has provided a list of inputs with at least two items, this list being a subset of all the inputs. Our task is to train the model such that each hidden node may be influenced by, for example, one out of the list. For example, if the model inputs are labeled with letters A-Z, then an example of one constraint is "only one input of the set {A, B, C} may have influence at any hidden node". Their combined influence is permitted only at the final layer producing the score. Additional "and" constraints can be applied (which may or may not share inputs with others), such as "only one input of the set {C, D, E} may have influence at any hidden node", by duplicating the process below with the new set of inputs and polarities for each node. In practice, each constraint has its own data structures and operations, and all are applied to the weights after each training minibatch.

In the following, by way of example, the operation is disclosed in accordance with one or more embodiments with a single constraint. In this example, one input of the set {A, B, C} may have influence at any hidden node. The core technology for this constraint has been introduced in the monotonicity discussion: each input node and each hidden node retains a "polarity" value taken from the set of the constrained inputs appended with a "none" value, i.e. each polarity is one element of {A, B, C, none}. The polarity of input node A is "A", and similarly for B and C, with other inputs in the constraint list having polarities "none". The input nodes' polarities are fixed, but hidden node polarities are re-estimated during model training intermittently.

As with the sparsity and monotonicity constraints, the weights connections incoming to each hidden node are categorized into "conforming" and "non-conforming". The requirement for a conforming weight connecting source to destination is that the polarity of the source must be "none", or equal to the polarity of the destination. The nonconforming connections are bounded to have a sum of squared elements less than or equal to C(T) by applying a multiplicative rescaling factor (as described in the sparsity constraint section) if the constraint is violated.

In certain embodiments, the constraint may be optionally applied to weights connecting directly to the output node. In one example, such a constraint would mean that, for example, only one input of "{A, B, C}" may have any influence on the output. That might be useful for regularization or computational efficiency goals (e.g., if inputs A, B, C are known to be co-correlated and where one input ought to be retained in the final model) as opposed to regulatory or model palatability considerations, such as if a non-linear combination of these inputs could be construed to generate a proxy for a protected personal characteristic which is prohibited from being used in a model.

Similar to the monotonicity constraint, at some moments in the minibatch update for the constraint process, for example during $T_0 \leq T \leq T_1$, the polarities at the hidden nodes are re-estimated. The re-estimation process may include gathering the sum of absolute values of weights connecting into a hidden node, summing separately collated by distinct values of the source's polarity, and excluding "none" polarities. The polarity associated with the sum with the highest value is assigned as the polarity of the examined hidden node. This process may be repeated through the weight layers, starting with the first weight layer and first hidden layer, depending on implementation.

Accordingly, methods and systems are introduced to constrain, during the process of training an artificial neural network, the weights so that at the end of training, one or more desired properties are upheld: sparse connectivity into a hidden node, monotonicity of neural network output versus selected inputs, and prohibition of certain interactions among a named set of inputs from taking place in hidden or output unit computations. These constraints may improve the explainability, palatability and acceptability of artificial neural network models in regulated settings. The constraints may provide computational benefits by reducing the model size and increasing execution performance by forcing numerous coefficients to zero. The constraints may provide regularization to improve test-set performance and robustness to non-stationary changes in input and output distributions, particularly when including domain knowledge instead of arbitrary regularization criteria typically used in neural network practice.

Figure 4:
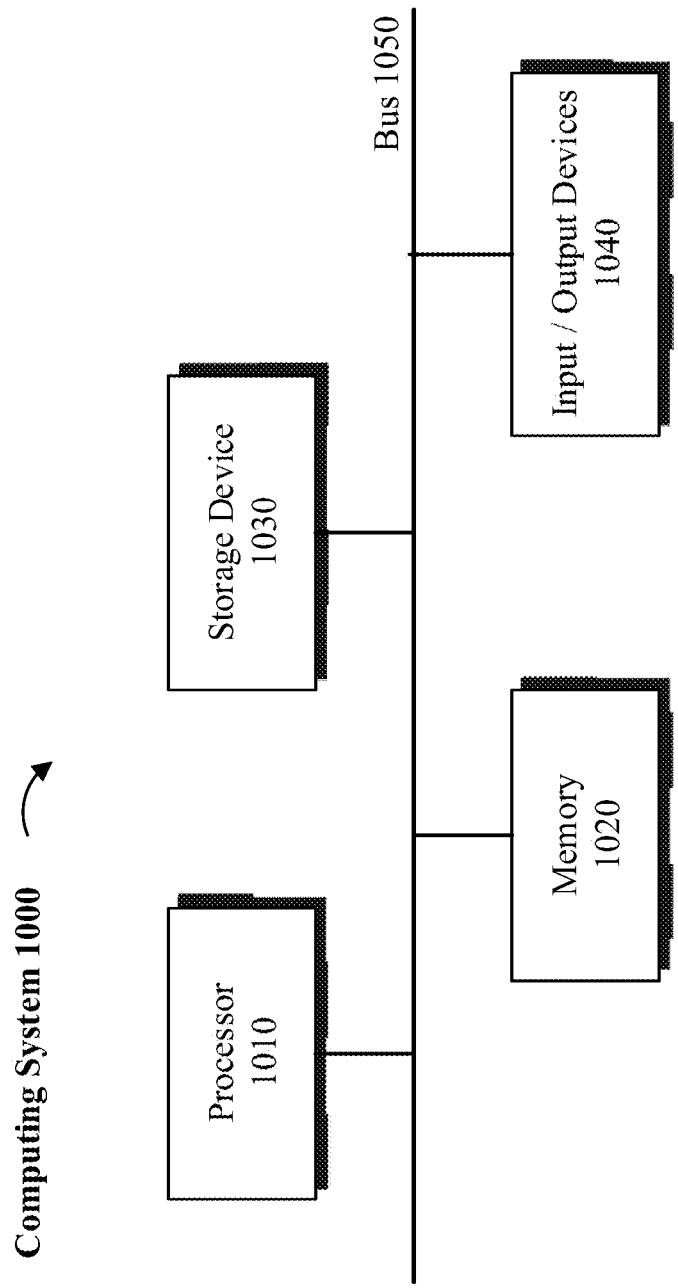
FIG. 4 is a block diagram of a computing system consistent with one or more embodiments.

Referring to FIG. 4, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 4, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent document or the patent disclosure, as it appears in the Patent and Trademark Office patent file or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A method for improving a computer-implemented machine learning model by way of constrained training, the method comprising:

during a training phase, using training data, as input, to train the machine learning model to derive a parametric function that minimizes error across input data associated with a prediction of output values, the machine learning model implemented over a plurality of nodes configured to represent a neural network as a directed graph comprised of nodes and edges, edges representing connections, the directed graph representing the machine learning model's computation, and at least one or more edges connecting the one or more nodes, an edge representing a connection between a first node and a second node, the connection being either conforming or non-conforming, and associated with at least one weight parameter;

continue training the machine learning model by iteratively adjusting weight parameters associated with the neural network nodes where the adjustment of the weight parameters is driven by input training data, output training data, one or more predicted values from the machine learning model, and a loss function associated with the prediction and training data;

determining that a first connection between two nodes in the neural network is conforming or non-conforming based on a constraint formula corresponding to a sign of the weight parameter assigned to the first connection and polarities of a source node and a destination node connected by the first connection, during the training phase, the constraint formula being based on a function of a signum value of the first connection and polarity values associated with the source node and the destination node, wherein $P_s$ is polarity of the source node associated with an output value to the destination node, $P_d$ is the polarity of the destination node associated with an input value received from the source node, sgn refers to signum value, and $w_{sd}$ is the weight parameter assigned to the first connection connecting the source node and the destination node such that:

| Polarity Status | Conforming weight |
|---|---|
| $P_s \cdot P_d = +1$ | $sgn(w_{sd}) \geq 0$ |
| $P_s \cdot P_d = -1$ | $sgn(w_{sd}) \leq 0$ |
| $P_s = 0$ | any value |
| $P_d = 0, P_s \neq 0$ | $w_{sd} = 0$ | and sparsifying connections between nodes in the neural network by adjusting the weight parameter associated with the connection towards a first value for non-conforming connections, the sparsifying being performed iteratively and gradually during the training phase to satisfy one or more constraints on the weight parameters of the neural network, wherein the corresponding constraint formula induces sparsity, the constraint formula being applied to the weights in a plurality of connections in the neural network by interleaving one or more constraining operations such that a weight change is applied to one or more weight parameters in the neural network to improve the satisfaction of one or more constraints and such that a first quantity of connections becomes conforming and a second quantity of connections remains non-conforming, wherein during the one or more constraining operations, a function of the weight parameters of a subset of the non-conforming connections is constrained to be less than or equal to the value of a function associated with a constraint schedule, and wherein at least a weight parameter of a non-conforming connection is maintained at a first value so that the trained machine learning model has one or more non-conforming weight parameters set to the first value during a production phase.

2. The method of claim 1, further comprising introducing one or more constraints associated with the machine learning model's parameters or features to guarantee certain regulatory or user-desired requirements are satisfied.

3. The method of claim 2, wherein the operation of one iteration of a loss-minimizing training algorithm that causes a weights change is interleaved with one or more optional constraining operations.

4. The method of claim 3, wherein during the constraining operation, functions of weight values of one or more non-conforming connection are changed during the training phase.

5. The method of claim 4, wherein the weight parameter of the non-conforming connection is maintained at zero during the training phase after the weight parameter of the non-conforming connection has been decreased to zero.

6. The method of claim 4, wherein the constraint schedule provides a value that decreases during the training phase.

7. The method of claim 6, wherein the function of the weight values involves an operation that ensures the sum of squares of weight values of a subset of non-conforming connections is less than the constraint schedule value, by applying a projection operator on a subset set of non-conforming weights so that the result after the application of the projection operator results in a squared L2 norm (sum of squares) whose value is less than or equal to the constraint schedule value.

8. The method of claim 7, wherein definition and values of the constraint schedule or schedules may be defined (a) network-wide, (b) per-layer, (c) per set of weights of connections incoming to any node, or (d) per set of weights on connections outgoing from any node.

9. The method of claim 6, wherein the function of the weight values involves an operation that clips the absolute value of a non-conforming weight to be less than the constraint schedule value by moving a corresponding weight value for the non-conforming connection to the nearest value consistent with the constraint schedule.

10. The method of claim 6, wherein the constraining operation involves an operation that ensures the sum of squares of weight values of a subset of non-conforming connections is constrained to be less than or equal to the constraint schedule value, by applying a projection operator on a subset set of non-conforming weights so that the result after the application of the projection operator results in a squared L2 norm (sum of squares) whose value is less than or equal to the constraint schedule value.

11. The method of claim 10, wherein the projection operator is implemented by multiplying the non-conforming set of weights by a real-valued scalar in the interval [0, 1] so that after the multiplication, the sum of squares of non-conforming weights is less than or equal to the constraint schedule value.

12. The method of claim 10, wherein an L1 norm, equal to the sum of absolute values of non-conforming weights, is substituted for the L2 norm.

13. The method of claim 2, wherein the user-desired requirements ensure monotonicity between one or more of the machine learning model's input and output values.

14. The method of claim 1, further comprising introducing one or more constraints associated with the machine learning model's parameters or features to prohibit interactions between nodes that result in improper biases or feature combinations.

15. The method of claim 1, wherein constraint operators and definition of conforming and non-conforming is be applied and defined (a) network-wide, (b) per-layer, (c) per set of weights of connections incoming to any node, or (d) per set of weights on connections outgoing from any node.

16. The method of claim 1, wherein definition of conforming and non-conforming serves to keep the most important weight values as conforming and less important weight values as non-conforming.

17. The method of claim 16, wherein conforming is defined as the largest K, determined externally or internally, values of one of the following functions of the set of weights, and the remainder being defined as non-conforming: (a) absolute value of weights, (b) first derivative of loss with respect to weight, (c) second derivative of loss with respect to weight, (d) first derivative of network output with respect to weight, (e) second derivative of network output with respect to weight, or (f) any mathematical function of any combination of (a-e), wherein the set of weights considered in the conforming vs non-conforming determination comprises one or more of the following: (a) network-wise, (b) layer-wise, (c) connections incoming to a node, or (d) connections outgoing from a node, and wherein the K value may be set (a) network-wise, (b) layer-wise, (c) per connections incoming to a node, or (d) per connections outgoing from a node.

18. The method of claim 1, wherein the conforming and nonconforming weights are defined so that when all nonconforming weights are zero, one or more inputs have a monotonicity relationship with one or more network output values with at least one input variable of a prespecified subset of input variables having a causal effect on the computation of a hidden node's activation.

19. A system comprising one or more processors configured to execute instruction code for:
using training data, during a training phase, as input, to train a machine learning model to derive a parametric function that minimizes error across input data associated with a prediction of output values,
 the machine learning model implemented over a plurality of nodes configured to represent a neural network as a directed graph comprised of nodes and edges, edges representing connections, the directed graph representing the machine learning model's computation,
 at least one or more edges connecting the one or more nodes, an edge representing a connection between a first node and a second node, the connection being either conforming or non-conforming, and the connection associated with at least one weight parameter;
continue training the machine learning model by iteratively adjusting weight parameters associated with the neural network nodes where the adjustment of the weight parameters is driven by input training data, output training data, one or more predicted values from the machine learning model, and a loss function associated with the prediction and training data;
determining that a first connection between two nodes in the neural network is conforming or non-conforming based on a constraint formula corresponding to a sign of the weight parameter assigned to the first connection and a source polarity of a source node and a destination polarity of a destination node, the source node and the destination node connected by the first connection,
wherein $P_s$ is polarity of the source node associated with an output value to the destination node, $P_d$ is the polarity of the destination node associated with an input value received from the source node, sgn refers to signum value, and $w_{sd}$ is the weight parameter assigned to the first connection connecting the source node and the destination node such that:

| Polarity Status | Conforming weight |
|---|---|
| $P_s \cdot P_d = +1$ | $\text{sgn}(w_{sd}) \geq 0$ |
| $P_s \cdot P_d = -1$ | $\text{sgn}(w_{sd}) \leq 0$ |
| $P_s = 0$ | any value |
| $P_d = 0, P_s \neq 0$ | $w_{sd} = 0$ | and
sparsifying one or more connections between nodes in the neural network by adjusting one or more respective weight parameters associated with the one or more connections towards a first value for the non-conforming connections from among the one or more connections,
 the sparsifying being performed iteratively and gradually during the training phase to satisfy one or more constraints on the one or more respective weight parameters associated with the one or more connections, wherein the corresponding constraint formula induces sparsity,
 the constraint formula being applied to the weights in a plurality of connections in the neural network such that a first quantity of connections becomes conforming and a second quantity of connections remains non-conforming, wherein during the one or more constraining operation, a function of the weight parameters of a subset of the non-conforming connections is constrained to be less than or equal to the value of a function associated with a constraint schedule, and wherein at least a weight parameter of a non-conforming connection is maintained at a first value so that the trained machine learning model has one or more non-conforming weight parameters set to the first value during a production phase.

20. A non-transitory storage medium with logic code embedded thereon, wherein execution of the logic code by one or more processors causes a computing system to:

use training data to train a machine learning model to derive a parametric function that minimizes error across input data associated with a prediction of output values, the machine learning model implemented over a plurality of nodes configured to represent a neural network as a directed graph comprised of nodes and edges, edges representing connections, the directed graph representing the machine learning model's computation, at least one or more edges connecting the one or more nodes, an edge representing a connection between a first node and a second node, the connection being either conforming or non-conforming and the connection associated with at least one weight parameter;

continue to train the machine learning model by iteratively adjusting weight parameters associated with the neural network nodes where the adjustment of the weight parameters is driven by input training data, output training data, one or more predicted values from the machine learning model, and a loss function associated with the prediction and training data;

determine that a first connection between two nodes in the neural network is conforming or non-conforming based on a constraint formula corresponding to a sign of the weight parameter assigned to the first connection and zero or more auxiliary values associated with a source node and a destination node connected by the first connection, the constraint formula being based on a function of a signum value of the first connection and the zero or more auxiliary values associated with the source node and the destination node, wherein $P_s$ represents a first auxiliary value associated with the source node, $P_d$ is a second auxiliary value associated with the destination node, sgn refers to signum value, and $w_{sd}$ is the weight parameter assigned to the first connection connecting the source node and the destination node such that:

| P Status | Conforming Weight |
|---|---|
| $P_s \cdot P_d = +1$ | $sgn(w_{sd}) \geq 0$ |
| $P_s \cdot P_d = -1$ | $sgn(w_{sd}) \leq 0$ |
| $P_s = 0$ | any value |
| $P_d = 0, P_s \neq 0$ | $w_{sd} = 0$ | and sparsify one or more connections between nodes in the neural network by adjusting one or more respective weight parameters associated with the one or more connections towards a first value for the non-conforming connections from among the one or more connections, the sparsifying being performed iteratively and gradually during training to satisfy one or more constraints on the one or more respective weight parameters associated with the one or more connections, wherein the corresponding constraint formula induces sparsity, the constraint formula being applied to the weight parameters in a plurality of connections in the neural network such that a first quantity of connections becomes conforming and a second quantity of connections remains non-conforming, wherein during the one or more constraining operation, a function of the weight parameters of a subset of the non-conforming connections is constrained to be less than or equal to the value of a function associated with a constraint schedule, and wherein at least a weight parameter of a non-conforming connection is maintained at a first value so that the trained machine learning model has one or more non-conforming weight parameters set to the first value during a production phase.

21. The non-transitory storage medium of claim 20, wherein the auxiliary values associated with the source node and the destination node are polarity values from a set of variables whose interactions are specified to be limited with a marker value of 'none', wherein the polarity values of an input layer of nodes are set to be corresponding members of a constraint set of inputs, if the values match, or with the 'none' marker value, if the values are not part of the constraint set, wherein in a conforming connection, polarity of the source node is 'none', or equal to the polarity of the destination node, wherein polarity values associated with hidden nodes in the neural network are initialized to random values from the set of variables, and wherein the polarity values of the hidden nodes are reset by a procedure, during training, that chooses a polarity value which maximizes the number of conforming weights among incoming or outgoing connections, or any function or combinations thereof.

* * * * *